May 24, 1966     K. R. SMITH II     3,252,670

CARTRIDGE FOR REVERSIBLY DRIVEN ENDLESS TAPE

Filed June 27, 1963     7 Sheets-Sheet 1

INVENTOR.
K. R. SMITH II
BY
*Attorneys*

May 24, 1966 K. R. SMITH II 3,252,670
CARTRIDGE FOR REVERSIBLY DRIVEN ENDLESS TAPE
Filed June 27, 1963 7 Sheets-Sheet 2

INVENTOR.
K. R. SMITH II
BY
*Flehr & Swain*
Attorneys

May 24, 1966  K. R. SMITH II  3,252,670
CARTRIDGE FOR REVERSIBLY DRIVEN ENDLESS TAPE
Filed June 27, 1963  7 Sheets-Sheet 4

INVENTOR.
K. R. SMITH II
BY
*Flehr and Swain*
Attorneys

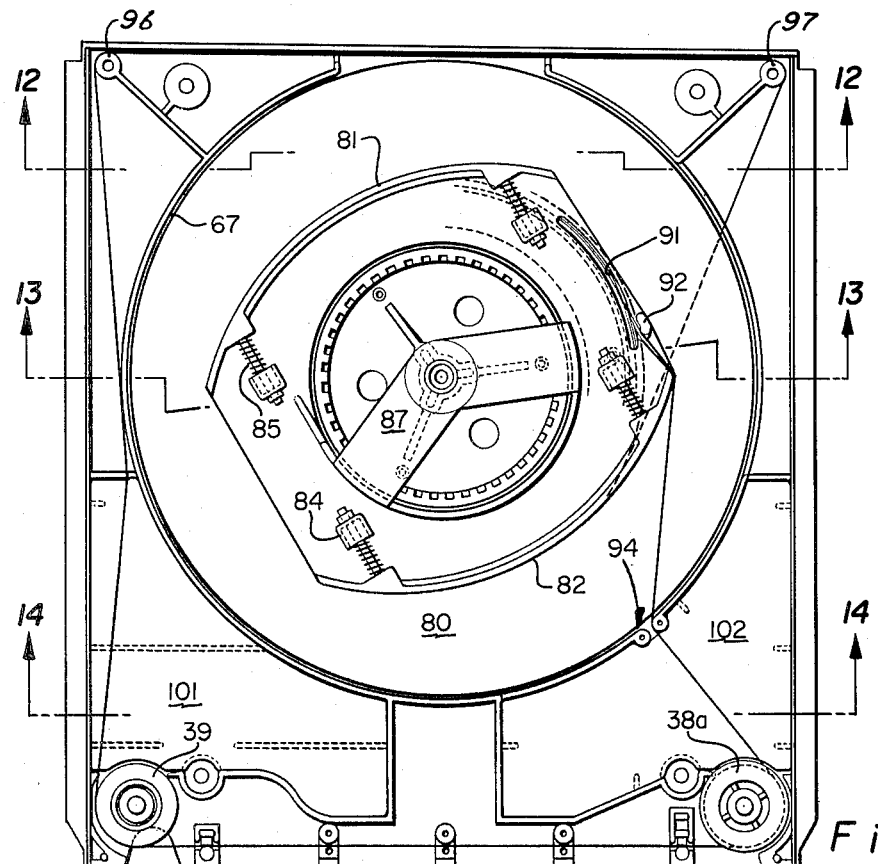
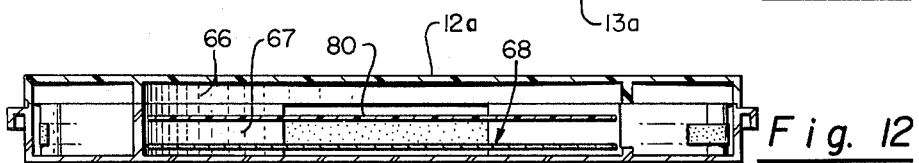
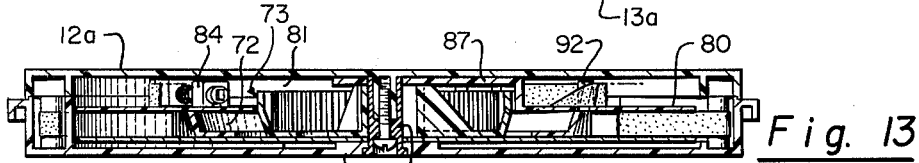
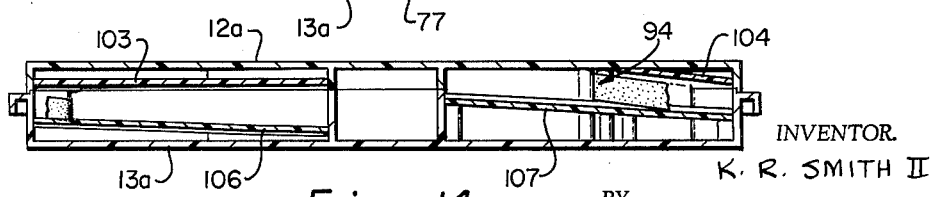

INVENTOR.
K. R. SMITH II

United States Patent Office 3,252,670
Patented May 24, 1966

3,252,670
CARTRIDGE FOR REVERSIBLY DRIVEN
ENDLESS TAPE
Robert Reynierson Smith II, Los Altos, Calif., assignor, by mesne assignments, to Continental Capital Corporation ("Continental") and Sierra Capital Company ("Sierra"), both of San Francisco, Calif., corporations of California
Filed June 27, 1963, Ser. No. 291,141
12 Claims. (Cl. 242—55.19)

This application is a continuation-in-part of my copending application Serial No. 209,691, filed July 13, 1962, and now abandoned.

This invention relates generally to a tape cartridge and more particularly to a tape cartridge of the type which supports an endless elongated tape-like recording medium.

Tape-like mediums are employed in the recordation and reproduction of sound and visual images, i.e., magnetic, electrostatic and optical recording. Prior art apparatus for transducing tape-like mediums falls generally into two broad classes. In one class of apparatus, the tape is carried by a pair of reels, one adapted to supply the tape medium from a supply coil and the other to take up the medium onto a take-up coil. The tape must be threaded into the apparatus. At the completion of a transducing (recording or reproduction) operation, the tape is rewound onto the supply reel.

In recent years, there has been introduced apparatus for operating on tape which is contained in cartridges. In this type of apparatus, the tape is brought into cooperative relationship with the transducer and tape drive means when the cartridge is fully inserted into the apparatus.

Cartridges may be of the double reel type (including supply and take-up reels), or they may be of the mobius or continuous loop type wherein an endless tape is wound as a coil onto a single hub. The tape is withdrawn from the inside of the coil and wound onto the exterior thereof. The latter type of magazines is preferred because they are compact. Furthermore, upon completion of a transducing operation, the beginning of the tape is at the center whereby it is ready for the next transducing operation without the necessity of rewinding.

A drawback with prior art continuous loop cartridges is the fact that the direction of travel of the tape-like medium cannot be reversed to repeat the recording or reproduction of a portion of the tape. This is especially important in such apparatus as teaching machines, educational movies, dictation equipment and like equipment where it might be desirable to reverse the tape to listen to a previous portion of the tape.

It is, therefore, an object of the present invention to provide a reversible endless tape cartridge.

It is still another object of the present invention to provide an endless tape cartridge which includes a floating take-up means for supporting an additional coil of the tape-like medium when the direction of the tape is reversed.

It is still a further object of the present invention to provide an endless tape cartridge in which the tape is taken up on a floating hub which is supported and driven by the main coil.

It is another object of the present invention to provide a tape cartridge of the type including a housing, a reel rotatably mounted in said housing adapted to receive an endless coil of a tape-like medium and means for guiding the portion of the tape which extends between the inside and outside of the coil which includes a take-up reel supported in and frictionally driven by the coil whereby to take up tape when the tape is driven in the reverse direction.

It is still a further object of the present invention to provide a tape apparatus for endless tape cartridges which is adapted to drive the tape in forward or reverse directions.

These and other objects of the invention will become more clearly apparent from the following description when taken in conjunction with the accompanying drawing.

Referring to the drawing:

FIGURE 11 is a plan view of the catridge of FIGURES 9 and 10 with the tape partially wound onto the take-up reel;

Figure 9:
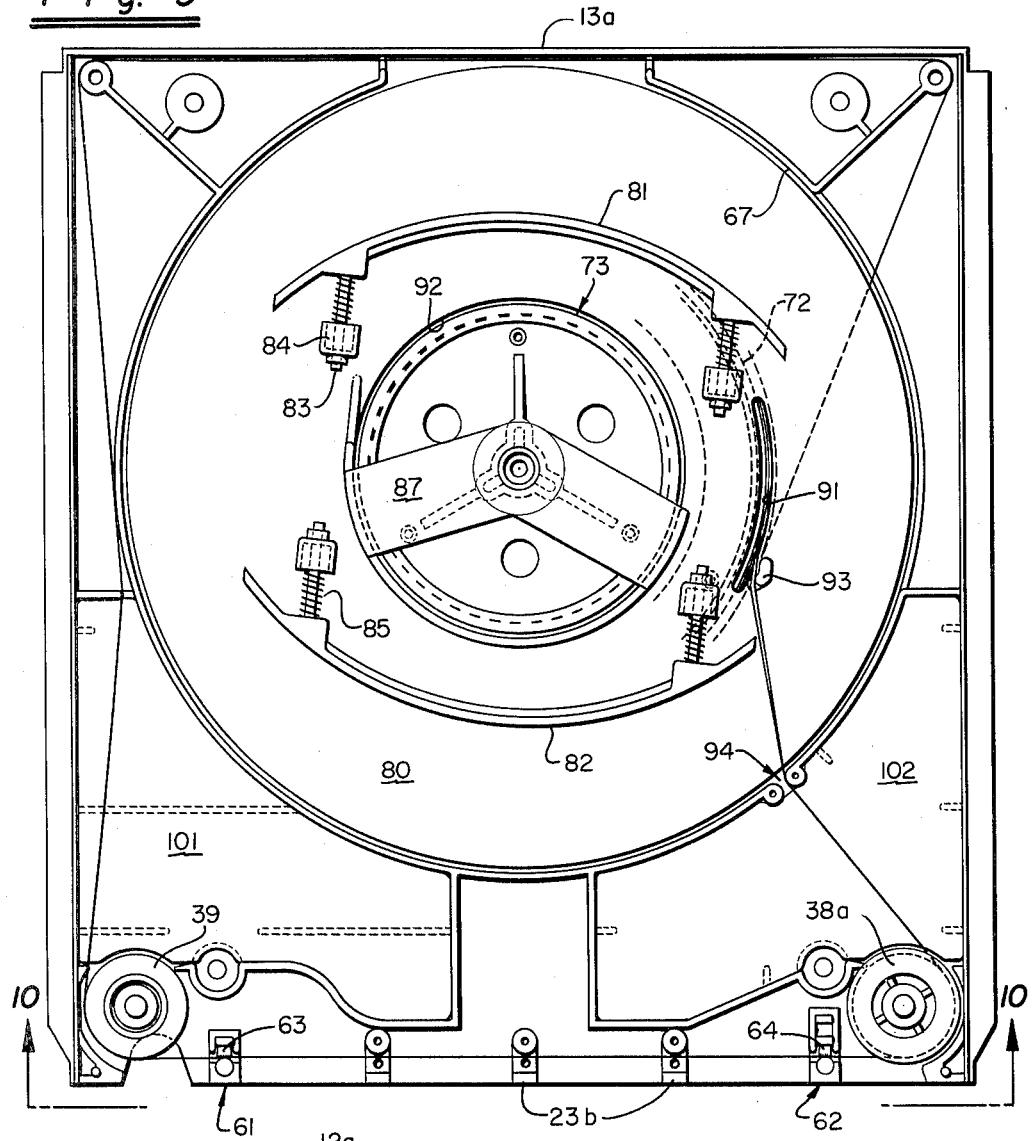
FIGURE 9 is a plan view of another cartridge incorporating the present invention.
Figure 10:
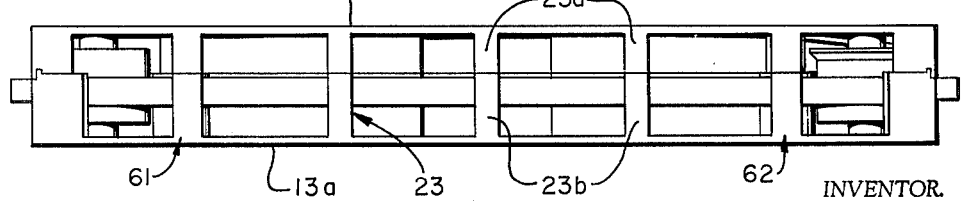
FIGURE 10 is a view taken generally along the line 10—10 of FIGURE 9.
Figure 15:
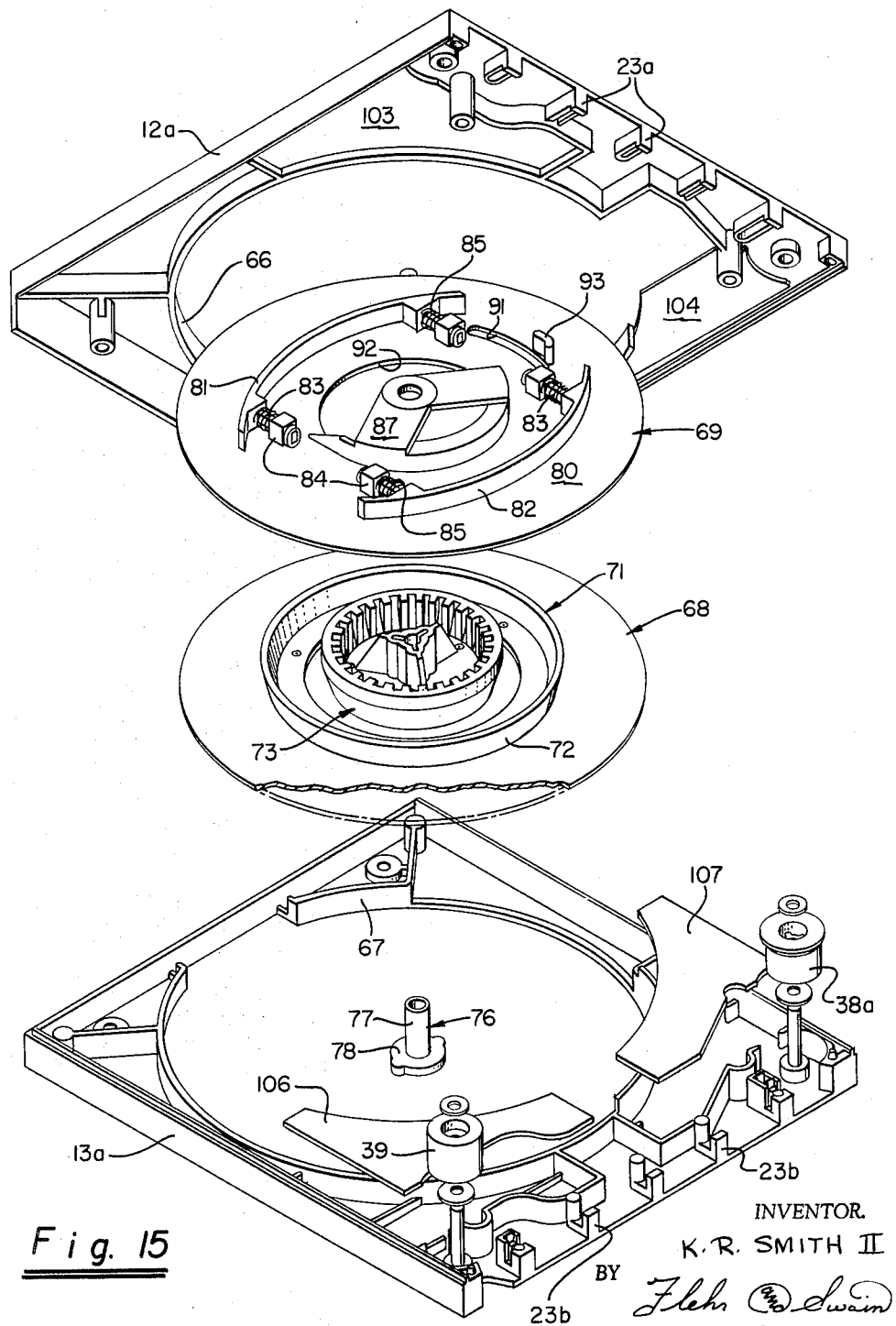

FIGURES 12, 13 and 14 are taken generally along the lines 12—12, 13—13 and 14—14 of FIGURE 11;

FIGURE 15 is an exploded view of the cartridge shown in FIGURES 9–11; and

Figure 16:
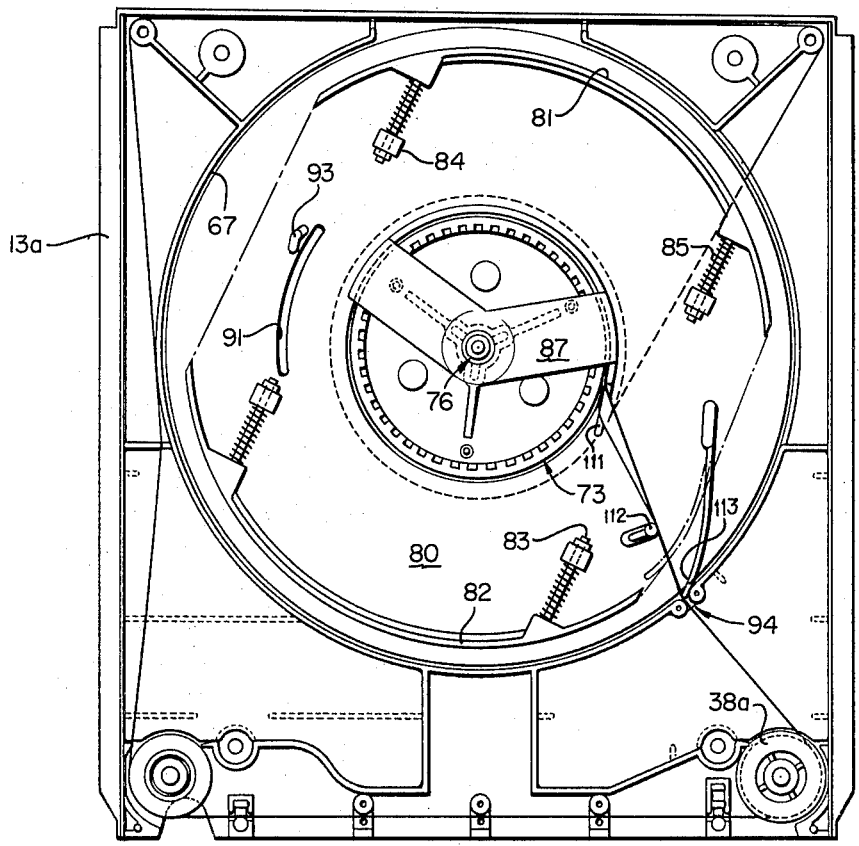

FIGURE 16 is a plan view of still another cartridge incorporating the present invention.

Figure 1:
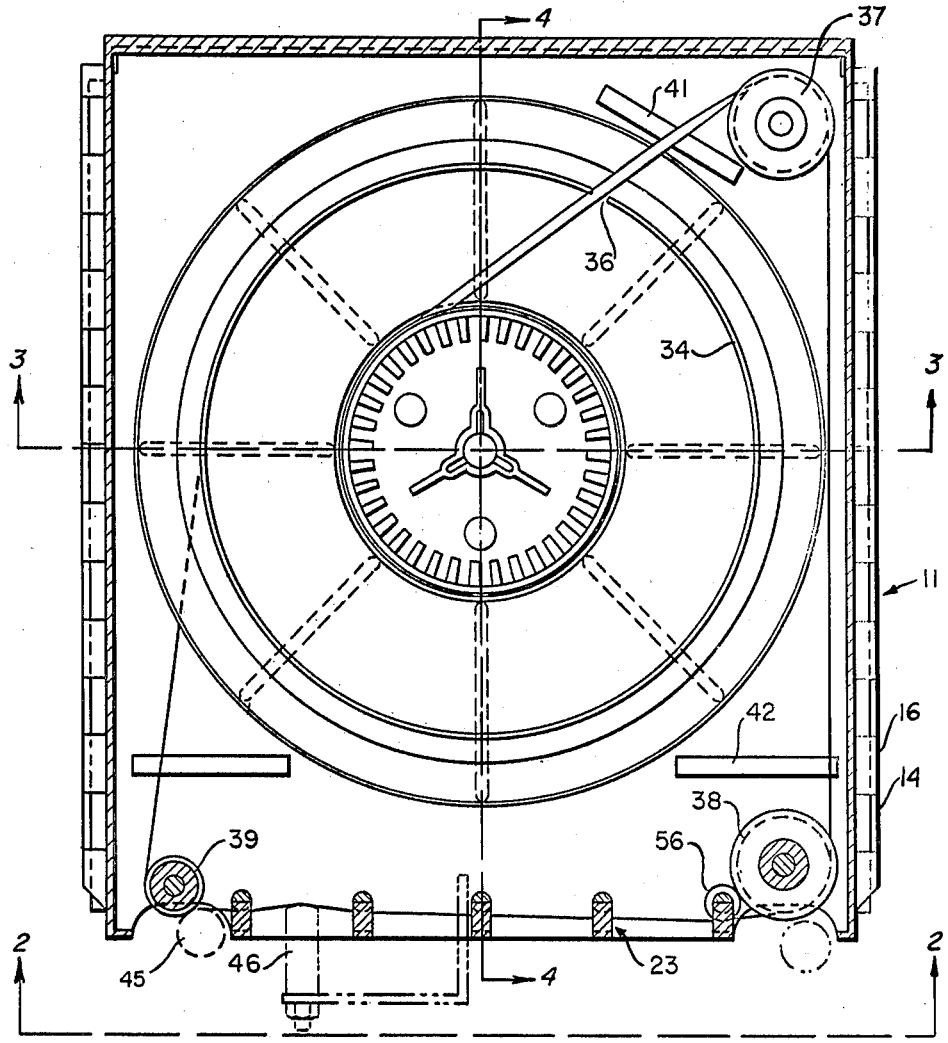
FIGURE 1 is a plan view of a tape cartridge taken generally along the line 1—1 of FIGURE 2.
Figure 2:
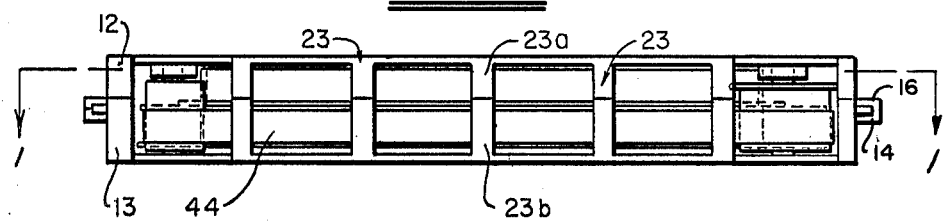
FIGURE 2 is a front elevational view of a tape cartridge taken generally along the line 2—2 of FIGURE 1.

Referring to FIGURES 1 and 2, the cartridge includes a housing 11 having upper and lower housing portions 12 and 13, respectively. Each of the housing portions 12 and 13 includes a plurality of spaced projections 14 and 16, respectively, along the side margins thereof. The spaced projections of one housing portion are disposed to fit between those of the other housing portion to provide a continuous ridge along the sides of the cartridge. The projections are L-shaped as viewed from the end of the cartridge, FIGURE 2, so that in combination they define a keyway. An elongated rectangular key is inserted in the keyway to lock together the housing portions.

The rear of the upper housing portion includes a downwardly projecting wall 18 which cooperates with an upwardly projecting ridge 19 of the lower housing portion. The forward end of the lower housing portion includes an upwardly extending wall portion 21. The wall includes a plurality of cut-outs or windows for purposes to be presently described. The wall portion 21 cooperates with a downwardly extending ridge 22 on the upper housing portion.

A number of spaced guide posts 23 have portions 23a and 23b formed integral with the top and bottom of the housing, respectively, with their ends abutting.

Figure 3:
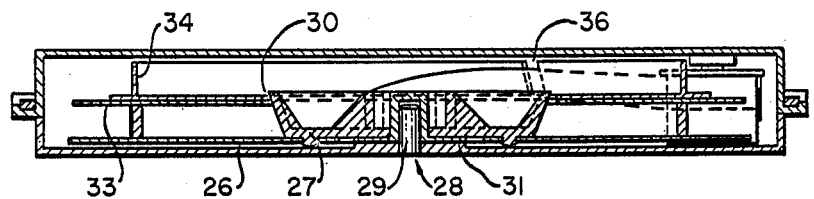
FIGURE 3 is a sectional view in elevation taken along the line 3—3 of FIGURE 1.
Figure 4:
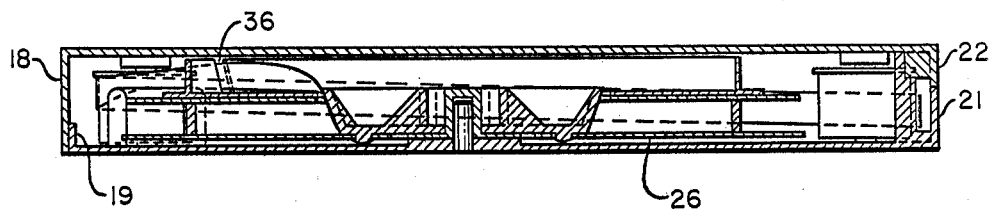
FIGURE 4 is a sectional view in elevation taken along the line 4—4 of FIGURE 1.

The lower housing portion rotatably carries a disc 26, seen more clearly in FIGURES 3 and 4. The disc is provided with a hub 27 formed therewith or suitably attached thereto. The disc and hub are rotatably mounted on bearing assembly 28 which includes a pin 29 carried by the lower housing portion, and a bearing 31 accommodated within the hub 27 and carried by the pin. Thus, the plate 26 and hub 27 are supported by the lower housing portion and are freely rotatable thereon.

The hub is adapted to receive and have wound thereon, in the form of a coil, a tape-like medium with the plate 26 serving to support the coil. The hub is preferably tapered inwardly towards the disc to facilitate the withdrawal of tape from the inside turn of the coil and to urge the coil against the disc.

A disc 33 having a central opening 30 rides upon the upper surface of the coil. The central opening 30 cooperates with the hub whereby it is centered on the coil. The disc is rotatably supported on the upper surface of the coil. The disc 33 may have formed integral therewith or attached thereto an upwardly extending rim or hub 34 which, as will be presently described, acts to take up the tape when the tape direction is "reversed." The take-up hub is slotted, 36, so that the tape can extend from the central convolution, over the idler roller 37 disposed at the rear of the housing, toward the front of the housing, over idler roll 38, across the front of the machine, over pinch roller 39 and rewound back onto the main coil. Guides 41 and 42 carried by the housing portion engage the side margins of the tape to position the same within the cartridge so that it is presented to the transducing means which extend through the opening 44, FIGURE 2, formed in the front wall 21.

In its normal forward mode of operation, the tape is withdrawn from the inside of the coil by the capstan 45 of associated apparatus cooperating with the pinch roller 39 carried by the housing to withdraw the tape from the center of the coil, over the idler rollers and across the front of the machine, where it cooperates with the transducing means.

As the tape is withdrawn from the center of the coil, it causes the coil disc 26 and hub 27 to rotate. Due to the differences of diameter between the inner and outer convolutions of the coil, the outer periphery of the coil is always going at a peripheral velocity which is greater than the velocity of the tape so that there is always a take-up tension on the tape. The differences in velocity are accommodated by slippage between the adjacent convolutions of the tape, as is well known. The aforegoing operation of the cartridge in the normal mode is conventional and will not be described further. The disc is held against forward rotation by the tension of the tape acting in the slot 36 to provide a holdback force which overcomes the frictional driving force.

The drive capstan 45 is employed to drive the tape past the transducing unit in the normal (forward) mode. The apparatus for use with the present cartridge includes an auxiliary capstan 51 which is driven in common with the capstan 45. The capstan 51 is arranged so that it does not engage the tape. An intermediate roller 52 is interposed between the auxiliary capstan 51 and the idler roll 38 to drive the tape in reverse as will be presently described.

Figure 5:
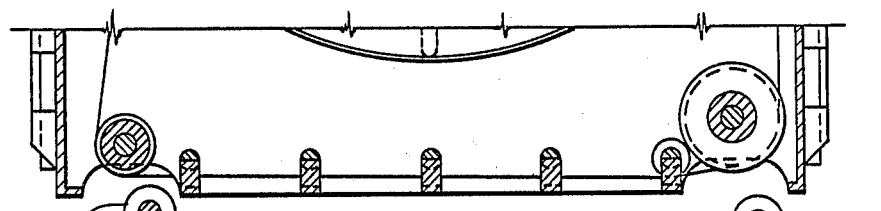
FIGURES 5, 6 and 7 are partial views showing the cartridge cooperating with portions of associated apparatus in the standby, forward and reverse modes of operation, respectively.
Figure 6:
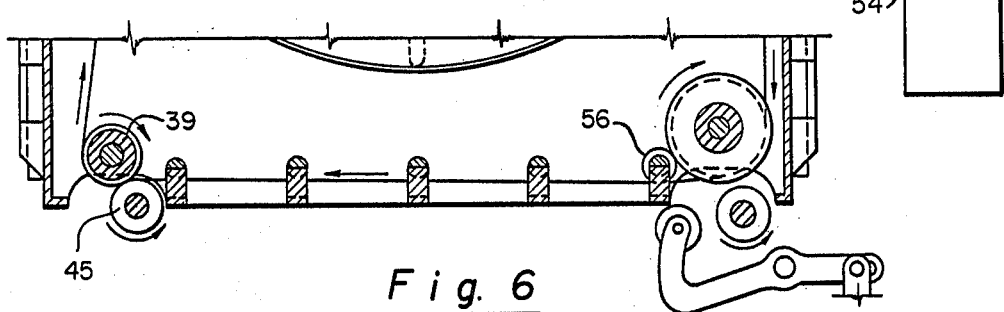
Figure 7:
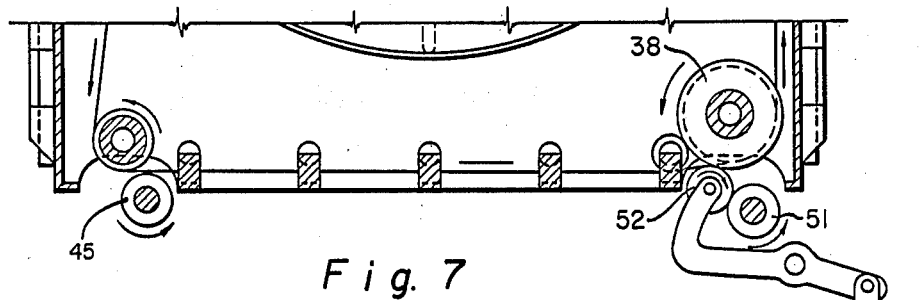

Referring now more particularly to FIGURE 5, the cartridge is shown mounted in an apparatus which includes a capstan 45 and an auxiliary capstan 51 driven in the same direction. For example, a belt drive (not shown) may drive the auxiliary capstan from the main capstan drive. The cartridge, as shown in FIGURE 5, is in its standby position, that is, the cartridge is only partially inserted into the machine. In FIGURE 6, the cartridge, as shown, is fully inserted into the machine whereby the capstan 45 and pinch roller 39 cooperates to drive the tape in its normal (forward) mode. As previously described, this is conventional.

However, in accordance with the present invention, there is also provided means whereby the tape may be driven in a reverse direction. Such means, for example, comprises the intermediate roller 52 carried by the pivotally mounted arm 53 which is actuated by a solenoid 54. When the solenoid is energized, the intermediate roller 52 is brought into cooperation with the roller 51 and the idler roller 38 whereby the tape is driven in reverse. The roller 52 urges the cartridge back away from the capstan 45 whereby it is disengaged to permit movement of the tape in the opposite direction. The tape is now withdrawn from the outside of the coil and driven towards the inside. It is apparent that as the tape is withdrawn from the outside of the roll, the velocity of the center coil of tape will be too low to take up the tape, and without more, the tape would spill into the housing. In accordance with the present invention, however, as the direction of rotation is reversed, the floating disc is driven in a counter-clockwise direction as viewed in FIGURE 1 by the friction between it and the coil. The tape winds onto the take-up hub 34 to form a "take-up" coil. To minimize spillage or slack in the tape during the reverse operation, the diameter of the take-up hub 34 is preferably selected to be near the average diameter of the normal coil. As a result, the circumferential length of tape withdrawn during each revolution from the outside of either tape coil and wound onto the other is taken up without spillage.

With some tape wound on the take-up hub and the apparatus switched to the forward mode of operation, the tape is withdrawn from this hub with the friction between the floating disc and the coil serving to drive the main coil to thereby take up tape as it is supplied from the take-up coil. As soon as all the tape on the take-up hub is fed out, the tape is withdrawn from the center of the main coil and the floating disc will float as previously described.

In certain instances, it is desirable to provide a holdback tension on the tape. A felt wheel 56 may be provided for this purpose. Other well known means, for example, a felt pad, may also be used.

Figure 8:
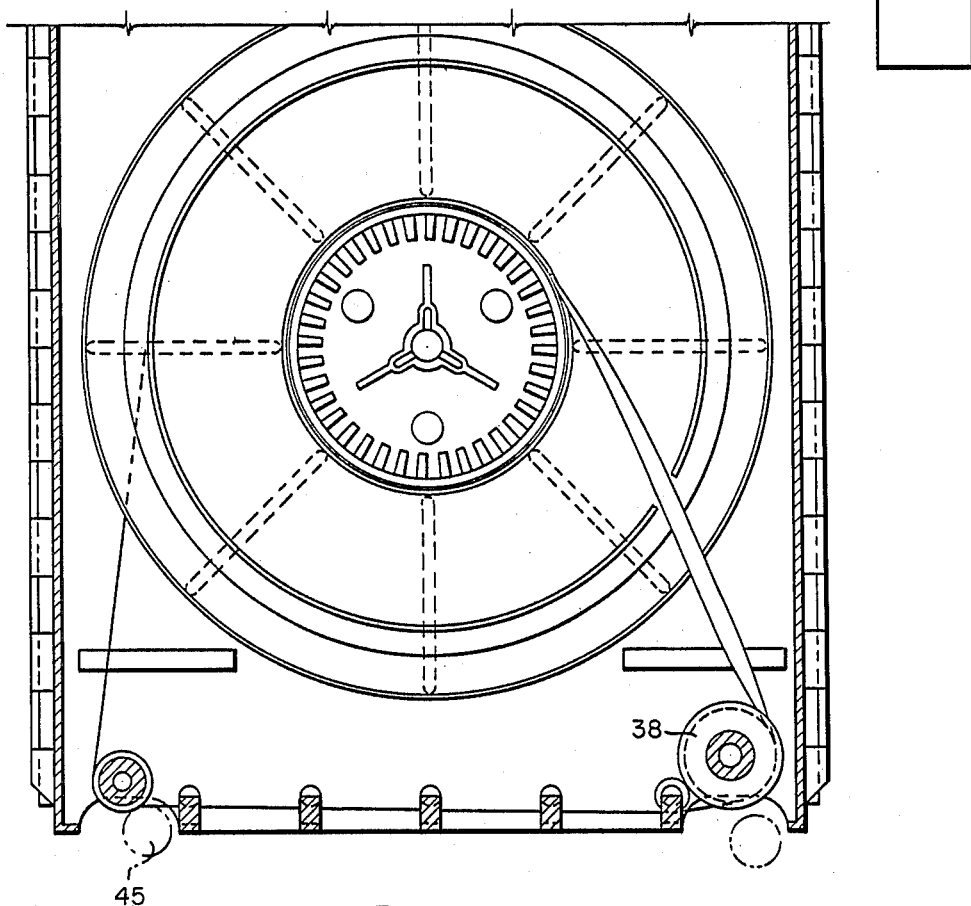
FIGURE 8 is a plan view of a magnetic tape cartridge in which the tape extends directly to and from the front of the cartridge.

In FIGURE 8, there is shown a cartridge substantially similar to that described above. The cartridge does not include a rear idler roller to provide a length of free tape which aids in averaging out pressure fluctuations. The tape extends directly from the inner turn of the coil to the front of the machine to engage the idler roller 38a.

Referring to FIGURES 9–15, the apparatus illustrated is similar to that previously described, and thus like reference numerals are referred to like parts.

The cartridge includes upper and lower housing portions 12a and 13a which form the magazine or cartridge for rotatably mounting the reels. The housing includes guide posts 23 which are formed by the cooperating portions 23a and 23b carried by the top and bottom housing portions. The spaced guide posts 23, identified as 61 and 62, include soft pads 63 and 64, respectively, which frictionally engage the tape and provide hold-back tension. The pads may, for example, be made of felt or other felt-like material.

The upper and lower housing portions are provided with cooperating rings 66 and 67 which define a chamber which accommodates the main reel 68 and the frictionally driven take-up reel 69. The main reel 68, illustrated in FIGURE 15, includes a disc 71 having an outwardly tapered outer hub 72 to facilitate the withdrawal of tape from the inner convolution of a coil of material carried by the reel. The reel may also include an upwardly and outwardly extending inner hub 73. The outer hub 72 is employed when a tape having a relatively short length is employed whereby to form a coil of large diameter. For a long length of tape, the hub 72 is removed and the tape is wound on the inner hub 73.

The main reel 68 is rotatably supported on the post 76 which accommodates the bearing 77 of the main reel. The surface 78 serves to rotatably support the disc to maintain it spaced from the lower wall of the housing portion 13a.

The so-called takeup reel 69 includes a hub formed by a pair of arcuate spring-loaded members 81 and 82 mounted on a disc 80. Each of the spring-loaded members 81 and 82 includes a pair of spaced pins 83 which are slidably accommodated in the upwardly extending bosses 84. Springs 85 urge the arcuate members outwardly.

A spider 87 is suitably attached to the disc portion to rotatably mount the take-up reel on the post 76. This maintains the take-up reel 69 centered regardless of the position of the cartridge. The disc 80 also includes a slot 91 through which the tape extends when the coil is wound on the outer hub 72 of the lower reel. On the other hand, when the outer hub 72 is removed and the tape is wound on the inner hub 73, the tape is withdrawn upwardly through the space between the opening 92 of the disc and the adjacent hub 73 much as shown in FIGURE 1 of the embodiment previously described.

The boss or ear 93 is provided to engage and guide the tape as it is withdrawn from the center of the coil through the slot 91. The tape extends outwardly over the disc and through the slot 94 formed in the rings which define the reel chamber. The tape then passes over an idler roller 38a across the front of the cartridge guided by the guide posts 23, over the capstan idler 39, thence towards the back of the cartridge, over posts 96 and 97 and is then wound onto the coil.

As previously described, the upper reel serves as the take-up reel when the tape is driven in the reverse direction. In this mode of operation, the tape is withdrawn from the outer convolution of the coil carried on the main reel by engaging a reversing mechanism such as that previously described in conjunction with the drive capstan 51 and idler roll 52. As the tape is withdrawn from the outer convolution, the top disc which rides on the coil of tape is frictionally driven by the lower coil in a counter-clockwise direction as viewed in FIGURES 9 and 11. This counter-clockwise rotation will serve to wind the tape onto the expansible hub formed by the members 81 and 82. The overall circumference of the members will adjust to accommodate the tape being supplied from the outer convolution of the coil.

Generally, the expansible take-up hub will adjust to nearly the same circumference as the underlying coil of tape carried by the hub 72.

The embodiment shown in FIGURES 9–14 includes temporary storage or holding chambers 101 and 102 adjacent the idler rollers 39 and 38a, respectively. These chambers 101 and 102 are defined by plates 103, 104 and 106, 107, respectively, carried by the associated upper and lower housing portions.

The take-up chamber 101 serves to take up any excess tape being supplied when the tape is being driven in its normal forward direction as, for example, when the tape is taken from a slightly larger take-up hub to a slightly smaller outer convolution on the main coil. Similarly, for driving in the reverse direction, there may be an excess of tape because the outer convolution of the coil is larger than the take-up hub. The excess tape is conveniently accommodated in the storage chamber 102.

Referring to FIGURE 16, there is shown a cartridge capable of handling large tape loads. The tape is wound onto the inner hub 73 and withdrawn from the space between the frictionally driven disc of the take-up reel and the adjacent hub portion over the guide 111, past the guide 112 and through the slot 94. The flexible member 113 acts to lock the top plate against rotation when the tape is withdrawn in its normal direction. The end of the member 113 engages that portion of the tape between the guide 112 and slot 94 and bends until its end presses on the tape at the slot. This prevents clockwise rotation of the top plate. The pressure is such that the tape can still be easily withdrawn.

There is provided, by the present invention, an endless tape cartridge suitable for use with various tape-like recording mediums such as magnetic, optical or electrostatic tape. The cartridge provides means in the form of a take-up reel frictionally driven by the main coil of material to take up tape when it is driven in the reverse direction. Storage means are provided for storing any excess tape in either mode of operation. The cartridge includes means for providing take-up tension to the tape and also includes means for centering the upper disc whereby the cartridge may be operated in any position. The take-up hub may conveniently be expansible whereby to accommodate for different diameters of the outer convolution of the main coil.

Summarizing, there is provided a tape cartridge of the type including a housing with a reel rotatably mounted therein supporting an endless coil of a tape-like medium with means for guiding that portion of the tape extending between the inner and outer convolution so that it cooperates with an associated transducing means in which there is provided a take-up reel which is frictionaly driven by the main coil to take up the tape when it is driven in the reverse direction.

I claim:

1. A cartridge for storing tape-like recording mediums comprising a housing, means within said housing for supporting an endless coil of tape-like recording medium with a portion of said medium extending between the inner and outer convolutions whereby in normal usage of said cartridge, the tape is withdrawn from the inner convolution of said coil and wound onto the outer convolution, and take-up means coaxially supported on and frictionally driven by said coil in cooperative relationship with said portion of tape-like recording medium whereby to take up the tape when it is withdrawn from the outer convolution of the coil in reverse operation.

2. A tape cartridge comprising a housing, a reel having a disc and an upwardly extending hub rotatably mounted in said housing, said reel being adapted to have wound thereon an endless coil of tape, a take-up reel including a disc supported on said endless coil and frictionally driven thereby and including an upwardly extending hub, said take-up reel being rotatably mounted on said first hub, and means for guiding the tape between the inner convolution and the outer convolution and over said disc and past said second hub, said take-up reel serving to receive and take up the tape when it is withdrawn from the outer convolution.

3. A tape cartridge comprising a housing, a reel rotatably mounted in said housing, said reel including a disc and an upwardly extending hub, said reel being adapted to have wound thereon an endless coil of magnetic tape with a portion of the tape extending between the inner and outer convolutions, whereby in normal usage the tape is withdrawn from the inner convolution and wound onto the outer convolution, a take-up reel rotatably mounted about said hub and including a disc supported on and frictionally driven by said endless coil and an upwardly extending take-up hub, and means for guiding the tape between the inner convolution, over the disc and onto the outer convolution of the coil, said take-up reel serving to receive the tape when the tape is withdrawn from the outer convolution in reverse operation.

4. A tape cartridge as in claim 3 wherein said take-up hub includes arcuate portions and means for urging said portions radially outwardly to expand the hub.

5. A tape cartridge as in claim 3 wherein said take-up hub comprises two segments mounted for movement in a radial direction and urged outwardly by spring means.

6. A tape cartridge as in claim 3 wherein said cartridge includes means for locking the take-up reel against rotation as the coil of magnetic tape is driven in its normal direction.

7. A tape cartridge as in claim 3 including a temporary storage means for storing excess tape as the tape is being fed from the inner convolution to the outer convolution of said coil.

8. A tape cartridge as in claim 3 including a temporary storage means for storing excess tape when the tape is withdrawn from the outer convolution and fed onto said take-up hub.

9. A tape cartridge as in claim 3 in which said guide means includes means providing tention to said tape.

10. A tape cartridge as in claim 5 wherein said cartridge includes means for locking the take-up reel against rotation as the coil of magnetic tape is driven in its normal direction.

11. A tape cartridge as in claim 10 including a temporary storage means for storing excess tape as the tape is being fed from the inner convolution to the outer convolution of said coil.

12. A tape cartridge as in claim 11 including a temporary storage means for storing excess tape when the tape is withdrawn from the outer convolution and fed onto said take-up hub.

References Cited by the Examiner
UNITED STATES PATENTS

| | | | |
|---|---|---|---|
| 1,317,404 | 9/1919 | Thomas | 242—55.14 |
| 1,691,414 | 11/1928 | Thornton. | |
| 1,950,601 | 3/1934 | Droll et al. | 242—55.21 |
| 2,042,599 | 6/1936 | Heinis | 242—55.19 |
| 2,338,421 | 1/1944 | Fries | 242—55.19 |
| 2,778,636 | 1/1957 | Eash | 242—55.19 |
| 2,975,990 | 3/1961 | Rodriguez | 242—55.13 X |
| 3,025,014 | 3/1962 | Casey | 242—67.3 |

FOREIGN PATENTS

| | | |
|---|---|---|
| 1,209,558 | 9/1959 | France. |
| 401,947 | 11/1933 | Great Britain. |

References Cited by the Applicant
FOREIGN PATENTS

| | | |
|---|---|---|
| 629,027 | 4/1936 | Germany. |

OTHER REFERENCES

"R.C.A. Technical Notes," R.C.A.T.N. No. 202 (January 5, 1959).

MERVIN STEIN, *Primary Examiner.*

B. S. TAYLOR, *Assistant Examiner.*